United States Patent [19]

Aishima et al.

[11] 3,857,914
[45] Dec. 31, 1974

[54] METHOD FOR EXTRUDING A FOAMED, MOLDED ARTICLE

[75] Inventors: Itsuho Aishima, Tokyo; Hisaya Sakura; Hiroshi Shimizu, both of Kawasaki, all of Japan

[73] Assignee: Asahi Kasei Kogyo Kabushiki Kaisha, Osaka, Japan

[22] Filed: May 1, 1972

[21] Appl. No.: 249,715

Related U.S. Application Data

[63] Continuation-in-part of Ser. No. 867,687, Oct. 20, 1969, abandoned.

[30] Foreign Application Priority Data

Oct. 21, 1968 Japan.............................. 43-76068

[52] U.S. Cl................ 264/45.5, 264/46.1, 264/176, 264/177, 264/237, 425/4 C
[51] Int. Cl....................... B29d 23/04, B29d 27/00
[58] Field of Search ........... 264/46, 45, 47, DIG. 14

[56] References Cited
UNITED STATES PATENTS

| | | | |
|---|---|---|---|
| 3,058,161 | 10/1962 | Beyer et al........................ | 264/47 X |
| 3,299,192 | 1/1967 | Lux...................................... | 264/48 |
| 3,327,030 | 6/1967 | Reifenhauser...................... | 264/47 |
| 3,337,914 | 8/1967 | Corbett et al...................... | 264/47 X |
| 3,431,163 | 3/1969 | Gilbert............................... | 264/48 X |
| 3,461,496 | 8/1969 | Winstead........................... | 264/48 X |
| 3,764,642 | 10/1973 | Boutillier............................. | 264/47 |
| 3,773,877 | 11/1973 | Baker et al. ...................... | 264/47 X |
| 3,782,870 | 1/1974 | Schippers........................... | 264/47 X |

Primary Examiner—H. S. Cockeram
Attorney, Agent, or Firm—Waters, Roditi, Schwartz & Nissen

[57] ABSTRACT

A foamed, molded article having a skin core structure in which a skin layer is in a substantially unexpanded state and a core layer is in substantially expanded state. The article is prepared by introducing a flowable, expandable thermoplastic resin into a casting means having a plurality of partitioned passages, and externally cooling the passage containing the skin layer to solidify the skin layer substantially when it exits from the casting means while the material of the core layer is discharged from the casting means into a region of lower pressure to expand and become integrated with the solidified skin layer, forming the expansible or expanded resin having different expansibility or different degree of expansion from one another in the passages, and extruding the resin integrally.

9 Claims, 9 Drawing Figures

FIG. 1
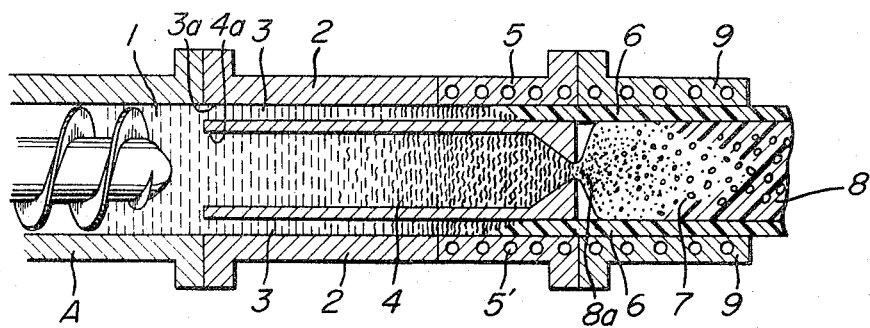
FIG. 2b   FIG. 2a   FIG. 2c
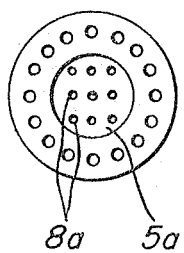 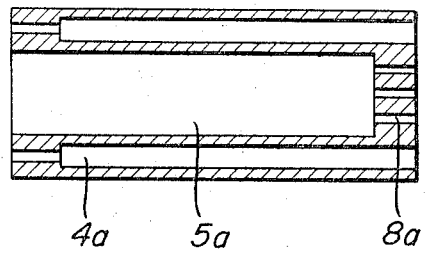 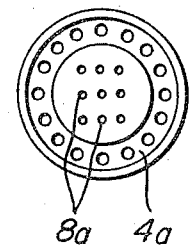

METHOD FOR EXTRUDING A FOAMED, MOLDED ARTICLE

CROSS RELATED APPLICATION

This is a continuation-in-part application of our earlier application Ser. No. 867,687 filed Oct. 20, 1969 now abandoned.

BACKGROUND OF THE INVENTION

1. Field of the Invention

This invention relates to a method for preparing a foamed, molded article having portions with different degrees of expansion and more particularly to an article having a skin-core structure with a substantially unexpanded skin portion and an expanded core portion.

2. Description of the Prior Art

It is known to cover the surface of a foamed, molded product with an unexpanded substance to improve the appearance of the product or to increase its mechanical strength. Such covering is made by adhesively joining to the surface of an already completely foamed, molded article an unexpanded film or sheet which has been molded in advance. It is also known to fill foamed materials into a space surrounded by an expanded, sheet-like or film-like material.

However, these conventional methods require a large number of steps and it is impossible to produce a molded article of complicated form.

A foamed article prepared according to the method disclosed in French Pat. No. 1,498,620 has a thin, unexpanded layer and poor strength, and an article having a larger size cannot be prepared.

SUMMARY OF THE INVENTION

As a result of intense studies to solve the drawbacks associated with conventional methods, the inventors have discovered a novel method capable of continuously preparing a foamed, molded article of a heterogeneous structure whose skin or surface portion is in a substantially unexpanded state and has a higher density than that of a core portion expanded state. The article may have a round or flat shape and the skin portion may completely or partially surround the core portion. In fact, the molded article may have any complicated cross-sectional shape.

According to the invention, an expandable resin is passed through casting means mounted at an outlet of an extruder and the expandable resin undergoes different degrees of expansion in the casting means to form the layers of different density in an integrated, finished article.

More specifically, according to the present invention a method is provided for producing a foamed, molded article having a skin-core structure in which the degree of expansion of the skin is different from that of the core, said method comprising introducing a flowable, expandable, thermoplastic resin into a casting means having a plurality of partitioned passages for respectively forming skin and core layers, externally cooling the skin layer at least in the region of the outlet of the casting means, the skin layer being cooled to a temperature lower than the softening point of the resin to substantially solidify the resin in the substantially unexpanded state, maintaining the resin passing through at least one passage for forming the core layer in a substantially unexpanded state under pressure without cooling and extruding all of the resin from the casting means into a lower pressure zone in which the resin from the passage for forming the core layer is immediately expanded to become integrated with the solidified resin which forms the skin layer.

The term "substantially unexpanded" used herein refers not only to a completely unexpanded state but also to degrees of expansion less than 1.2 times. The term "substantially solidified" used herein refers to the state in which the skin layer is solidified to such an extent that the shape of the molded article can be maintained, and the inside of the skin layer itself possibly being incompletely solidified to facilitate adherence thereof with the core layer.

Polymers applicable to the present invention may be any expandable thermoplastic polymer, for example, olefin polymers, such as low density polyethylene, high density polyethylene, polypropylene, poly-4-methylpentene-1, poly-butene-1; aromatic vinyl polymers, such as polystyrene, poly-$\alpha$-methylstyrene, poly-p-chlorostyrene, polyvinyl toluene, etc.; halogenated olefin polymers, such as polyvinyl chloride, polyvinylidene chloride, polyvinyl fluoride, poly-1-chloro-3-fluorostyrene, etc.; polyamide resins, such as polycaprolactam (nylon 6), polyhexamethylene adipamide (nylon 6-6), polyhexamethylene sebacamide (nylon 6-10), polydecamethylene sebacamide (nylon 10-10), etc.; polyester resins, such as polyethylene terephthalate, polytrimethylene terephthalate, polyethylene isophthalate, polytetraethylene terephthalate, etc.; polyacetal resins; polycarbonate resins; polymethyl methacrylate resins; cellulose derivative resins, such as cellulose tributyrate, cellulose triacetate, etc.; or copolymers of these resins. These resins may be used alone or in admixture of two or more.

Any method for forming a flowable, expansible polymer by means of an extruder is applicable to the present invention. Further, a conventional method for supplying an organic compound or inorganic compound capable of generating a gas by thermal decomposition to an extruder together with pellets or a method for forming an expandable polymer by adding to the polymer, under pressure, an organic compound having a boiling point less than the softening point of the polymer or a substance which is a gas in the normal state, for example, nitrogen gas, carbon dioxide gas, air, etc. The organic compound can be added to the polymer at a middle section of the extruder and the polymer kneaded.

The polymer flowing in the partitioned passages of the casting means is transformed into expandable polymers having a different expandability within each passage.

The polymer extruded from at least one of the passages has a substantially unexpanded state, any method for lowering the expandability of the polymer in this passage can be used and such methods are not limited in the present invention. The achievement of the unexpanded state is preferably obtained by lowering the temperature within the associated passage, although it is also possible to reduce the gas content in the polymer. As a result, the polymer extruded from said passage is substantially unexpanded. In order to lower the polymer temperature in said passage, the walls of said passage are externally cooled by a cooling medium.

BRIEF DESCRIPTION OF THE DRAWING

FIG. 1 is a diagrammatic cross-sectional view of apparatus for forming a cast product according to the present invention;

FIG. 2a is a longitudinal cross-section of a modified casting means of the apparatus of FIG. 1;

FIG. 2b is a left end view of the casting means of FIG. 2a;

FIG. 2c is a right end view of the casting means of FIG. 2a;

FIGS. 2a–2c show a modified version of the casting means wherein at the outlet for the passage for stream 4a there are provided small perforations 8a.

DETAILED DESCRIPTION OF THE INVENTION

Figure 3:
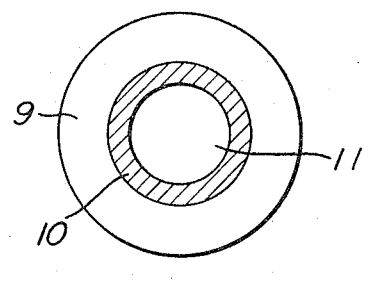
FIG. 3 is a cross-sectional view of a foamed, molded article obtained according to the present invention.

Referring to FIG. 1 of the drawing, there is seen a molten, expandable polymer 1 extruded from an extruder A and introduced into an extruding die or casting means 2. The polymer 1 is divided in the casting means 2 into two streams 3 and 4, the stream 3 serving to form a surface skin layer portion of the final article and the stream 4 serving to form the inner or core layer portion of the final article. The molten expandable polymer composition in the casting means 2 is in the unexpanded state. The stream 3 (molten expandable polymer) is cooled in a cooling means 5 provided in the neighborhood of the outlet of the casting means 2. A coolant is circulated through passages 5' in cooling means 5 to control the temperature of the polymer in the stream 3, so that the polymer is in a completely or substantially completely solidified state 6. The resin may be directly discharged from the casting means into ambient air or it may be advanced from the casting means into a former 9 which may also be cooled externally. The stream 4 is extruded from the casting means 2 and passes into a lower pressure zone 7 in which the polymer is immediately expanded to form a foam 7 which becomes melt-adhered to the solidified surface skin layer 6 whereby an integrated product is formed. This product is gradually cooled in the former 9 to form a skin-core structure foam article 8.

In this embodiment, portions of different degree of expansion are formed at the outlets of passages 3a and 4a by providing a difference in expansibility between the polymer passing through the passage 3a and that passing through the passage 4a. That is, the polymer passing through the passage 3a is in a compressed state and cooled externally and thus is substantially unexpanded. On the other hand, the polymer passing through the passage 4a is also in a compressed state, but is not expanded and is in a flowable state. That is, it still has sufficient expansibility. Therefore, the polymer starts to bubble after it has passed through the small perforations 8a and is transformed into a core portion having a higher degree of expansion than that of the polymer extruded from the passage 3a.

The cooling of the passage 3a is effective for forming a substantially unexpanded skin portion of higher density than the core portion. The cooling is carried out in the neighborhood of the outlet of the casting means, and is not effected in the neighborhood of the inlet of the casting means, because the polymer introduced into the casting means must be kept in a sufficiently flowable state to make the weld-line formed in the polymer by any internal supports in the passage within the casting means completely disappear. When the region of the outlet of the passage 3a is cooled to such a degree that the polymer in the neighborhood of said passage loses the flowability and gains a form-retaining capacity, the pressure loss in said passages can be changed by varying the take-up speed of the molded article, and consequently the inner pressure can be adjusted. As a result, the adjustment of the degree of expansion of the core portion or the adjustment of a thickness of the substantially unexpanded skin portion can be effected merely by the adjustment of the take-up speed of the molded article. This is a very convenient expedient. As another method for lowering the expansibility in the polymer within the passage 3a, the gas content in this portion of the polymer can be made less than that in passage 4a by degassing the polymer which is to pass through the passage 3a by some suitable method.

Degassing can be attained by forming fine pores in the walls surrounding passage 3a so as to pass the gases from the polymer traveling therethrough while preventing the polymer itself from flowing through the pores. Such pores can be conveniently obtained by forming the walls of the passage from sintered metal.

The size and arrangement of the plurality of partitioned passages of the casting means depends upon the desired cross-sectional shape of the foamed, molded article or the shape or position of the unexpanded portion or high density portion within the cross-section of the foamed, molded article. However, the outlet of a group of passages of the casting device should not be made larger than the cross-sectional shape of the desired molded article or should not be made considerably smaller than the cross-sectional shape thereof, but should be arranged in substantially close contact with the cross-sectional shape of the foamed, molded article. When the substantially unexpanded portion or the high density portion is at the surface layer of the foamed, molded article, two passages are necessary, namely passages 3 and 4 in FIG. 1.

Figure 4:
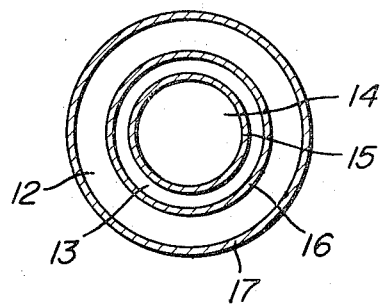
FIG. 4 is a sectional view taken at the front of the outlet portion of a casting means for preparing the foamed, molded article having the cross-section shown in FIG. 4.

FIG. 3 shows a cross-sectional view of a foamed, molded article obtained according to the present invention where the portion 10 is higher in density than portions 9 and 11. FIG. 4 is an end view of the outlet of a casting means showing an arrangement of passages for producing a foamed, molded article having the cross-section of FIG. 3, the polymer streams extruded from the outlets of the passages 12 and 14 forming the portions 9 and 11 of FIG. 3. The outlet of the passage 13 extrudes the polymer stream which forms the portion 10 of FIG. 3. Numerals 15, 16 and 17 are walls constituting the respective passages.

Figure 5:
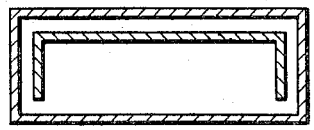
FIG. 5 is a transverse cross-sectional view of another version of the casting means according to the present invention.

It is necessary for most of the boundaries for the respective passages of the casting means to be partitioned by partition walls. However, it is not always necessary that the respective passages are separated from one another by completely confining partition walls. Sometimes, the partition wall may be partly cut away to allow one passage to communicate with another passage, as shown in FIG. 5. The partition walls which separate the passages from another, are fixed in place by transverse supports provided in the neighborhood of the entrance of the casting means passage as shown in FIG. 1 and this transverse support may be in the form of a perforated plate. It is preferable that the position of the transverse support be located as near as possible to the inlet of the casting means to prevent the molded article from having any weld lines due to the support. The length of the passage must be related to the kind of polymer, the temperature of the polymer and the desired degree of expansion of the molded article to provide solidification of the substantially unexpanded portion and the subsequent required degree of expansion of the polymer. However a longer passage is not objectionable.

It is preferable to introduce the polymer from the outlet of the passages of the casting means into the former 9 and the latter generally has the cross-sectional shape of the desired, molded article. The outlet and the former 9 is completely open. It is further preferable that the former 9 be cooled externally, but the temperature of the cooling and the length of the former 9 is sufficient, as long as the surface portion of the article is solidified to such a degree that the molded article can maintain its shape. Consequently, it is not always necessary to pass the molded article through the former 9 if the molded article leaving the passage 3 of the casting means is already in a shape-retainable state. The polymers leaving the outlets of passages 3 and 4 are separated by spaces formed by the thickness of the walls of the partitioned passages, and these spaces are filled with the polymer still in the flowable state and which form the low density portion. Thus an integrated, molded article is obtained.

Figure 6:
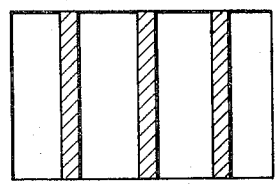
FIGS. 6 and 7 are cross-sectional views of additional foamed, molded articles prepared according to the present invention.
Figure 7:
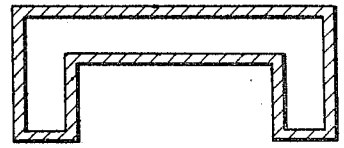

Foamed, molded articles, which can be prepared according to the present invention, include a cylinder having a higher density at the skin portion than at the core portion by using the casting means of FIGS. 1 and 2a-2c; a molded article having a high density skin layer on the inside surface or the outside surface or both inside and outside surfaces of a tubular or hollow molded article; and a molded article having annular high density portions within the molded article as shown in FIG. 3. Furthermore, a plate-like, molded article having high density skin portions at the side surfaces and the top surface can be obtained from a casting means having the cross-section as shown in FIG. 5. Furthermore, a molded article having a laminated cross-section of portions of different densities, as shown in FIG. 6, can be obtained. Still further, a molded article having a channel-like cross-section and a high density surface, as shown in FIG. 7, can be obtained. In FIGS. 3, 6 and 7, the cross-hatched areas represent the high density portion.

The present invention will be explained in further detail hereafter with reference to the following Examples:

EXAMPLE 1

100 parts by weight of low pressure polyethylene pellets (MI = 0.5; density = 0.958) was mixed with 0.5 part by weight of azodicarbonamide as a blowing agent in a blender, and then supplied to a 40-mm extruder and then at a rate of 12 kg/hr at 180°C to a casting means mounted at the discharge outlet of the extruder and having the construction as shown in FIGS. 2a-2c.

The thickness of the passage of the casting means was 4 mm, and its outer diameter was 6 cm. The total length of the casting means was 8 cm, and the length of the cooling means was 5 cm. The casting means was cooled with water at 18°C. The obtained molded article was a cylinder having a diameter of 5.8 cm, and its surface was very lustrous and at a depth of 2.5 mm from the surface there was no foam at all. The density of the article was 0.5 l/cc.

EXAMPLE 2

A mixture consisting of 100 parts by weight of polystyrene (Styron 666: a trademark of polystyrene made by Asahi Dow Chemical Co., Japan), 20 parts by weight of polystyrene pellets containing 8 percent by weight of n-pentane, and 0.5 part by weight of talc was extruded from the apparatus as in Example 1 at an extrusion rate of 12 kg/hr and at a polymer temperature of 150°C at a position just before the casting means whereby a cylindrically molded article of 5.6 cm diameter having an unexpanded surface layer 3 mm deep from the surface was obtained. The article has a good luster at the surface and the density of the molded article was 0.45 g/cc.

EXAMPLE 3

100 Parts by weight of high density polyethylene (MI = 3.6; density: 0.954) and 1.0 part by weight of 4,4'-oxybis benzene sulfonyl hydrazide were mixed together and supplied to a 40-mm extruder and further to a casting means of the construction as shown in FIGS. 2a-2c mounted at the discharge outlet of the extruder. The polymer was supplied at a temperature of 180°C. The total length of the casting means was 8 cm, the thickness of the passage 3a was 4 mm, and its outer diameter was 6 cm. The cooling means was 3 cm long and was cooled with water at 18°C. The polymer extruded from the casting means at the passage 3a was not sufficiently solidified to maintain the shape of the article. Thus, the cylindrical former 9 as shown in FIG. 1 was employed. The former 9 was cooled with water and had an inner diameter of 6 cm and a length of 10 cm. The polymer discharged from the casting means was passed through the former 9 and the obtained molded article had a diameter of 5.8 cm and an unexpanded surface layer 1.0 mm deep at the surface. The density of the article was 0.48 g/cc.

EXAMPLE 4

100 Parts by weight of a nylon 6-6 resin having an intrinsic viscosity of 1.5 was mixed with 1 part by weight of trihydrazine triazine

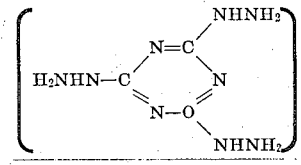

having a decomposition temperature of 260°C, and the resulting mixture was supplied to the same apparatus as in Example 1. The cooling temperature was 18°C. The temperature in the extruder was 290°C. The mixture was discharged through former 9 mounted at the outlet of the casting means at an extrusion rate of 12 kg/hr. The former provided at the outlet of the casting means had the same cross sectional shape as that of the outlet of the casting means and the former was cooled with water. The molded article extruded from the former was removed by means of a caterpillar type withdrawing means. The thus obtained molded article had a diameter of 5.6 cm and a density of 0.65 g/cc. The surface of the article to a depth of 0.5 mm was substantially unexpanded and free from bubbles.

EXAMPLE 5

100 Parts by weight of a polyacetal homopolymer (MI: 12) was mixed 0.7 parts by weight of azodicarbon amide, and the resulting mixture was supplied to the apparatus as in Example 4. The temperature in the extruder was 200°C. The cooling temperature was 18°C and the mixture was taken out at an extrusion rate of 12 kg/hr. The thus obtained molded article had a diameter of 5.6 cm and a density of 0.70 g/cc. The layer at the surface to a depth of about 4 mm was expanded by about 1.8 times.

EXAMPLE 6

100 Parts by weight of a polyethylene terephthalate resin having an intrinsic viscosity of 0.6 was mixed with 1.0 part by weight of nitroguanidine

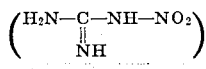

having a decomposition temperature of 240°C, and the resulting mixture was supplied to the same apparatus as in Example 4. The cylinder temperature in the extruder was 280°C and the cooling temperature was 18°C. The mixture was discharged through a casting means at an extrusion rate of 12 kg/hr while being cooled at the surface. The thus obtained molded article had a diameter of 5.6 cm and a density of 0.65 g/cc, and a layer from the surface to a depth of 1 mm was free from bubbles. The layer from a depth of 1 mm to a depth of about 4 mm had an average density of 0.71 g/cc and the remaining inside layer had an average density of 0.55 g/cc.

EXAMPLE 7

The same procedure as in Example 3 was repeated, except that the temperature of the cooling water in the cooling means was 60°C and the extrusion rate from the casting means was 15 kg/hr. A molded article was obtained having a density as a whole of 0.40 g/cc, the layer from the surface to a depth of about 0.5 mm being free from bubbles.

EXAMPLE 8 The same procedure as in Example 3 was repeated, except that the length of the cooling means at the outlet of the casting means was 5 cm. A molded article was obtained having a density as a whole of 0.55 g/cc, the layer thereof from the surface to a depth of about 3 mm being free from bubbles.

EXAMPLE 9

The same procedure as in Example 3 was repeated, except that oil at 110°C was substituted for the cooling water in the cooling means. A molded article was obtained in which a layer from the surface to a depth of about 6 mm had an average degree of expansion of about 1.3 and a core from a depth of 6 mm to the center had a degree of expansion of 2, there being no layer free from bubbles.

EXAMPLE 10

The same procedure as in Example 2 was repeated except that 4, 10 and 15 percent respectively by weight of n-pentene was substituted for the 8 percent by weight of n-pentane, to obrain a foamed, molded article having a density as a whole as shown in the following table, the thickness of the layer containing no bubbles being the same as in Example 2. ,170

EXAMPLE 11

Polyvinyl chloride (K value: 70) particles containing 2 parts by weight of zinc stearate per 100 parts by weight of polyvinyl chloride and the same weight as the polyvinyl chloride particles of dichlorotetrafluoroethane were placed in an autoclave maintained at 60°C under a pressure 18 kg/cm² for 24 hours to obtain polyvinyl chloride particles containing 37 percent by weight of dichrorotetrafluoroethane. The thus obtained foaming agent-containing polyvinyl chloride was extruded at an extrusion rate of 12 kg/hr by means of the same apparatus as in Example 3 at a cylinder temperature in the extruder of 160°C while externally cooling with water at 18°C the 3 cm long cooling means. The layer of the thus obtained foamed, molded article from the surface to a depth of 2 mm was quite free from bubbles and the remaining interior core had a density of 0.55 g/cc.

EXAMPLE 12

100 Parts by weight of a polymethyl methacrylate resin (intrinsic viscosity: 0.9) was mixed with 10 parts by weight of polystyrene particles containing 15 percent by weight of n-heptane, and the resulting mixture was supplied to the same apparatus as in Example 3. The cylinder temperature in the extruder was 170–200°C and the polymer temperature at the inlet of the casting means was 190°C. The cooling temperature was 18°C and the extrusion rate was 12 kg/hr. The cooling of the casting means was effected in a 2 cm long cooling means. The thus obtained molded article was free from bubbles in a layer from the surface to a depth of 3 mm, and the remaining core had a density of 0.72 g/cc.

EXAMPLE 13

Cellulose acetate having a degree of acetylation of 55 percent was supplied to a 40 mm diameter extruder provided at the outlet end with the casting means of FIGS. 2a, 2b and 2c. Methyl chloride was introduced under pressure into the resin in a proportion of 3 parts by weight per 100 parts by weight of the resin at a point 15 cm distant from the end of the extruder. The cylinder temperature in the extruder was 220°C. The casting means was cooled with water at 18°C in a cooling means 3 cm long. The resin was taken out from the casting means at an extrusion rate of 13 kg/hr. The thus obtained foamed molded article was quite free from bubbles in a layer from the surface to a depth of 2.5 mm and the remaining core had a density of 0.85 g/cc.

EXAMPLE 14

A polycarbonate polymer (MI: 2) was supplied to the 40 mm extruder as in Example 3, and dichlorodifluoromethane was introduced into the polymer in a proportion of 2 parts by weight per 100 parts by weight of the polymer under pressure through holes provided in the cylindrical wall of the extruder. At this time, the cylinder temperature was 285°C. The cooling of the casting means was effected with water in a cooling means 4 cm long and the cooling temperature was 18°C and the rate of extrusion from the extruder was 13 kg/hr. The thus obtained molded article was quite free from bubbles in a layer from the surface to a depth of 2 mm, and the remaining core had a density of 0.63 g/cc.

We claim:

1. A method for continuously extruding a foamed, molded article having a skin-core structure having a skin layer and a foam core, said skin layer having a thickness between 0.5 and 5 mm and a degree of expansion no greater than 1.2, said method comprising introducing a flowable, expandable, thermoplastic resin from a single source into a single extruding die having a plurality of partitioned passages for respectively forming skin and core layers, externally cooling the resin passing through at least one of the passages for forming the skin layer at least in the region of the outlet of the extruding due, the skin layer being cooled to a temperature lower than the softening point of the resin to substantially solidify the resin in the substantially unexpanded state while simultaneously maintaining the resin passing through at least one passage for forming the core layer in a substantially unexpanded state under pressure without cooling and extruding all of the resin from the extruding die into a lower pressure zone in which the resin from the passage for forming the core layer is immediately expanded to become integrated with the solidified resin which forms the skin layer.

2. A method as claimed in claim 1 including the additional step of confining the article when it is discharged from the extruding die to maintain the desired shape thereof.

3. A method as claimed in claim 2 including the additional step of cooling the article in the region where it is being confined after discharge from the extruding die.

4. A method as claimed in claim 1 wherein the passages in the extruding die are annular and formed concentrically.

5. A method as claimed in claim 1 wherein the thermoplastic resin is selected from the group consisting of high density polyethylene, low density polyethylene, polypropylene, polystyrene, polyvinyl chloride, acrylonitrile-butadiene-styrene copolymer, polyacetal, polyamide and polyester.

6. A method as claimed in claim 1 wherein the thermoplastic resin is polyethylene.

7. A method as claimed in claim 1 wherein the thermoplastic resin is polypropylene.

8. A method as claimed in claim 1 wherein the thermoplastic resin is polystyrene.

9. A method as claimed in claim 1 wherein the thermoplastic resin is acrylonitrile-butadiene-styrene copolymer.

* * * * *

UNITED STATES PATENT AND TRADEMARK OFFICE
CERTIFICATE OF CORRECTION

PATENT NO. : 3,857,914
DATED : December 31, 1974
INVENTOR(S) : Aishima et al

It is certified that error appears in the above-identified patent and that said Letters Patent are hereby corrected as shown below:

Change second inventor's name from "Sakura" to --Sakurai--

Signed and Sealed this

Tenth Day of May 1977

[SEAL]

Attest:

RUTH C. MASON
Attesting Officer

C. MARSHALL DANN
Commissioner of Patents and Trademarks